(12) United States Patent
DiRisio et al.

(10) Patent No.: US 7,120,355 B2
(45) Date of Patent: Oct. 10, 2006

(54) CAMERA ASSEMBLY HAVING LENS TURRET AND INDEPENDENTLY MOVABLE ROCKER

(75) Inventors: Anthony DiRisio, Rochester, NY (US); Thomas S. Albrecht, Canandaigua, NY (US); Michael L. Wirt, Avon, NY (US); Michael A. Litzenberger, Rochester, NY (US); Douglas H. Pearson, Rochester, NY (US); Joel S. Lawther, East Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 195 days.

(21) Appl. No.: 10/949,596

(22) Filed: Sep. 24, 2004

(65) Prior Publication Data

US 2006/0067665 A1   Mar. 30, 2006

(51) Int. Cl.
*G03B 5/00* (2006.01)
*G03B 13/12* (2006.01)

(52) U.S. Cl. .......................... 396/74; 396/84

(58) Field of Classification Search ............ 396/73–75, 396/84; 352/142; 359/672, 821
See application file for complete search history.

(56) References Cited

U.S. PATENT DOCUMENTS

| 4,690,531 A | 9/1987 | Hansen et al. ............... 396/62 |
| 5,047,792 A * | 9/1991 | Asano et al. ................. 396/61 |
| 6,449,430 B1 | 9/2002 | Tasaka et al. ................ 396/73 |
| 6,711,349 B1 * | 3/2004 | DiRisio ....................... 396/72 |
| 6,757,490 B1 * | 6/2004 | DiRisio ....................... 396/74 |

* cited by examiner

*Primary Examiner*—W. B. Perkey
(74) *Attorney, Agent, or Firm*—Robert Luke Walker

(57) ABSTRACT

A camera assembly has a mount defining an optical axis. The mount has opposed first and second stops. A rocker pivots between the stops. An over-center mechanism biases the rocker toward the nearer stop. A lens turret has primary and secondary openings. The lens turret rotates with the rocker between a first configuration and a second configuration upon pivoting of the rocker between first and second positions. The rocker is movable in a direction parallel to the optical axis, independent of the lens turret in both configurations.

27 Claims, 19 Drawing Sheets

CAMERA ASSEMBLY HAVING LENS TURRET AND INDEPENDENTLY MOVABLE ROCKER

CROSS REFERENCE TO RELATED APPLICATIONS

Reference is made to commonly assigned, co-pending U.S. patent application Ser. No. 10/949,391, entitled: CAMERA GUARD WITH BEZEL AND RING, filed 24 Sep. 2004, in the names of James G. Rydelek, Sunny C. Kim and John M. Staton.

Reference is made to commonly assigned, co-pending U.S. patent application Ser. No. 10/949,616, entitled: CAMERA ASSEMBLIES HAVING OVERLAPPING ROCKER AND LINK PROJECTIONS, filed 24 Sep. 2004, in the name of Anthony DiRisio.

FIELD OF THE INVENTION

The invention relates to photography and photographic equipment and more particularly relates to camera assemblies having lens turrets and over-center mechanisms.

BACKGROUND OF THE INVENTION

Cameras have long used turrets to switch mounted lenses. Turrets allow use of separate lenses in place of a zoom lens, at a savings of cost relative to a zoom lens of the same quality. On the other hand, turrets must move and precisely position each lens. This functionality is relatively easy to provide using costly mechanisms having close tolerances, but is more difficult using inexpensive mechanisms.

It is well known to use an over-center mechanism to switch a lens turret between positions. Such mechanisms have relatively powerful springs, which bias a turret toward the nearer of two positions. U.S. Pat. No. 6,449,430 to Tasaka et al., discloses a one-time-use camera, which has a switchable lens holder "kept respectively positioned exactly by the bias of" a toggle spring connected to the lens holder. The camera also has a retention spring that biases the lens holder toward a shutter cover.

Costs of inexpensive cameras can be reduced by allowing relatively large tolerances in most parts. A turret and connected over-center mechanism having such tolerances present a risk of tilting out-of-plane during switching between different lens positions. Such tilting can be caused by an inexact over-center biasing that tips the turret out-of-plane while urging the turret toward one or both lens positions. Countering the tilt by use of a strong retention spring runs the risk of stalling the turret.

Another risk of tilting can be presented by the use of a long lever to switch a lens turret. U.S. Pat. No. 4,690,531 uses a long lever to push against a turret having a connected over-center mechanism. The long lever allows for convenient positioning of a user control.

It would thus be desirable to provide camera assemblies and methods, in which the risk of lens turret tilting is reduced simply and inexpensively.

SUMMARY OF THE INVENTION

The invention is defined by the claims. The invention, in broader aspects, provides a camera assembly, which has a mount defining an optical axis. The mount has opposed first and second stops. A rocker pivots between the stops. An over-center mechanism biases the rocker toward the nearer stop. A lens turret has primary and secondary openings. The lens turret rotates with the rocker between a first configuration and a second configuration upon pivoting of the rocker between first and second positions. The rocker is movable in a direction parallel to the optical axis, independent of the lens turret in both configurations.

It is an advantageous effect of the invention that improved camera assemblies and methods are provided, in which a lens turret is switched by a rocker connected to an over-center mechanism to reduce the risk of lens turret tilting.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The term "fixed" and like terms are used herein in the sense of a physical position or relationship that is in immobile and unchanging.

The term "camera assembly" is used here to refer to a complete camera or an incomplete subunit of a camera that can be assembled with other parts to form a complete camera. The term "camera assembly" is inclusive of a complete one-time use camera and of a subassembly of a one-time-use camera. The usage of "camera" in the term "camera assembly" does not limit possible uses of a particular camera assembly. For example, a "camera assembly" that includes a lens system is inclusive of the usage of the same assembly as a component of binoculars. For convenience, camera assemblies are generally designated by more descriptive names related to respective functions in a completed camera.

Figure 1:
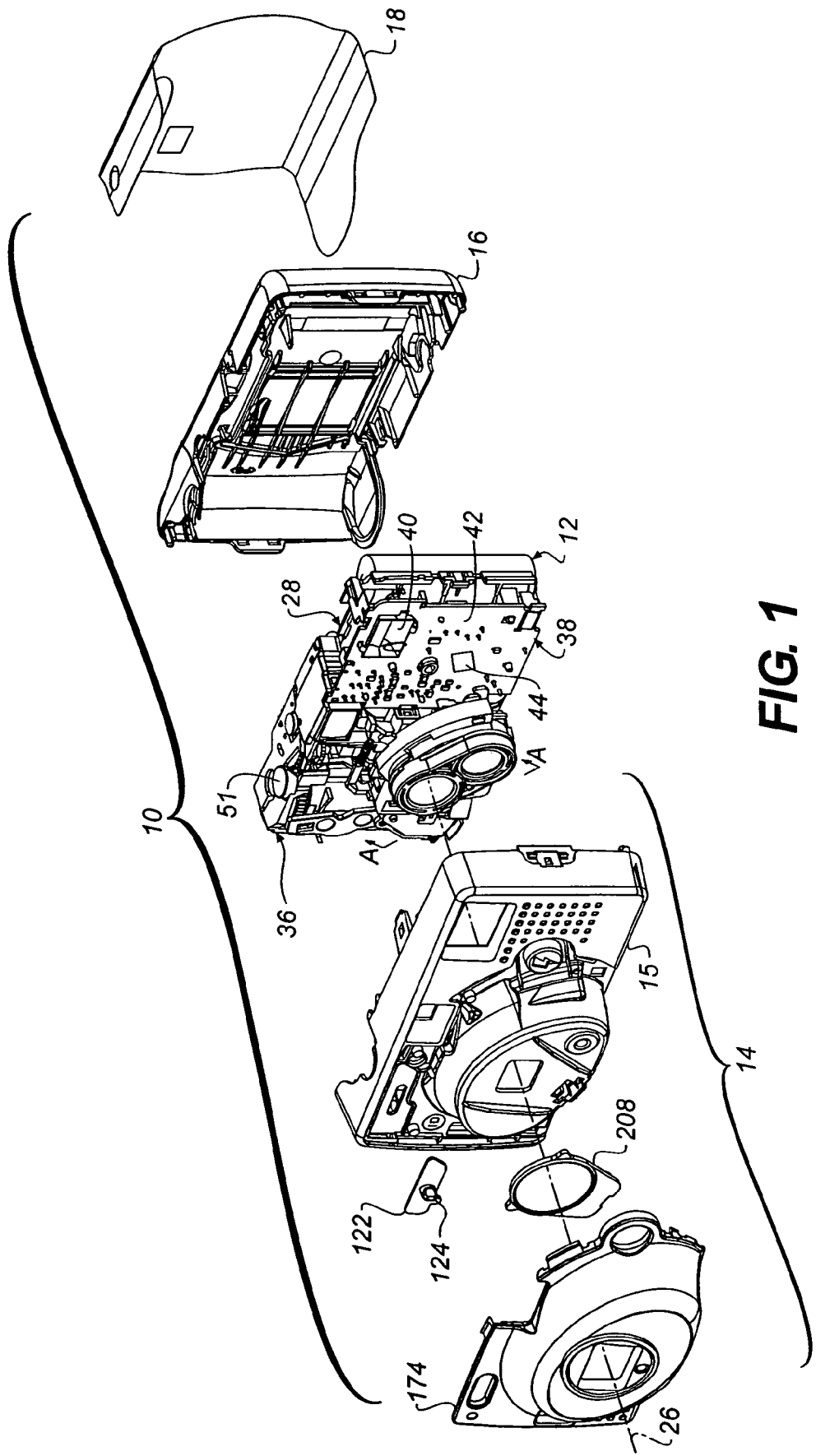
FIG. 1 is a partially exploded, front perspective view of an embodiment of the camera.
Figure 2:
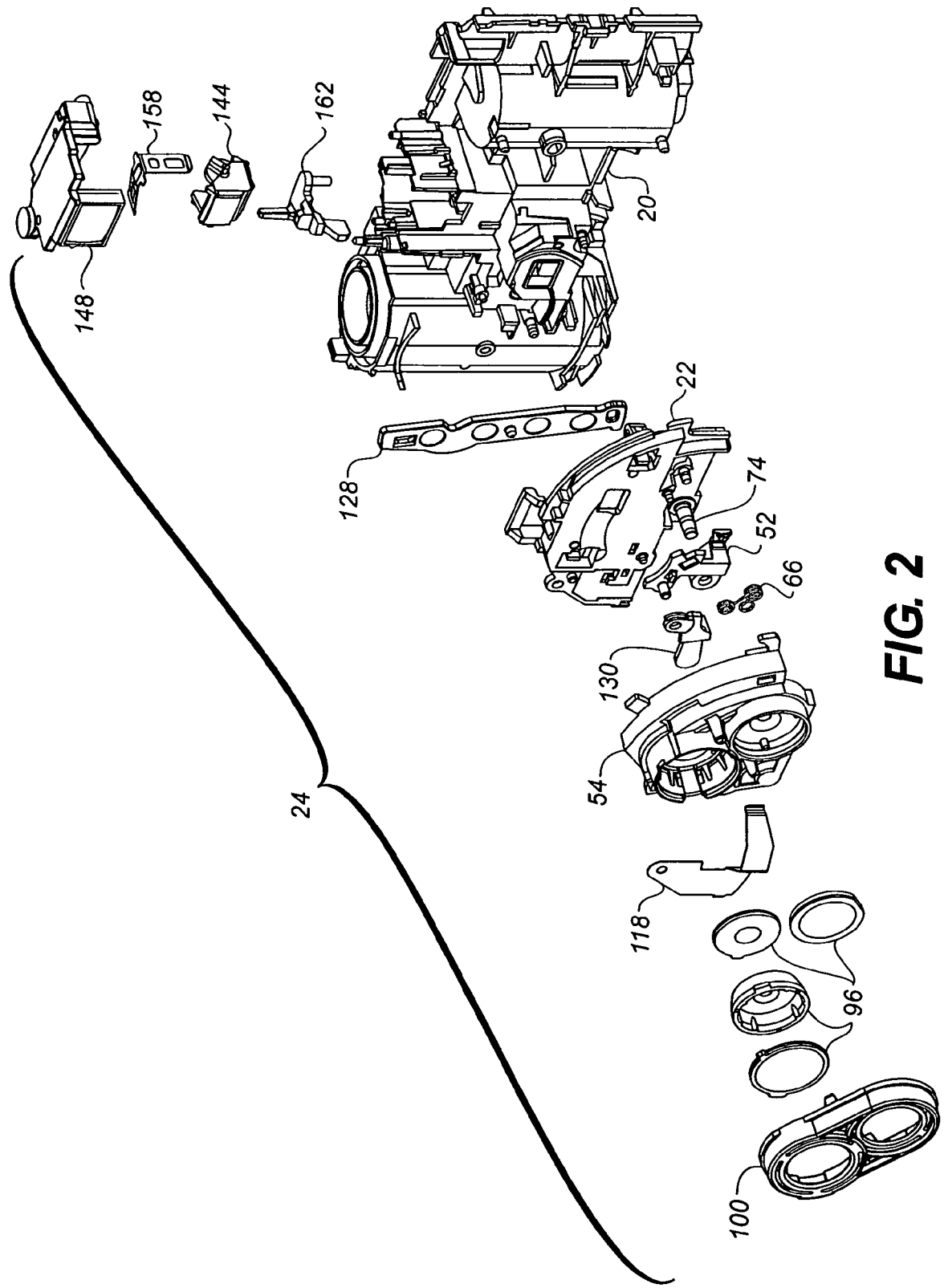
FIG. 2 is an exploded, front perspective view of the turret-viewfinder-frame assembly of the camera of FIG. 1.
Figure 3:
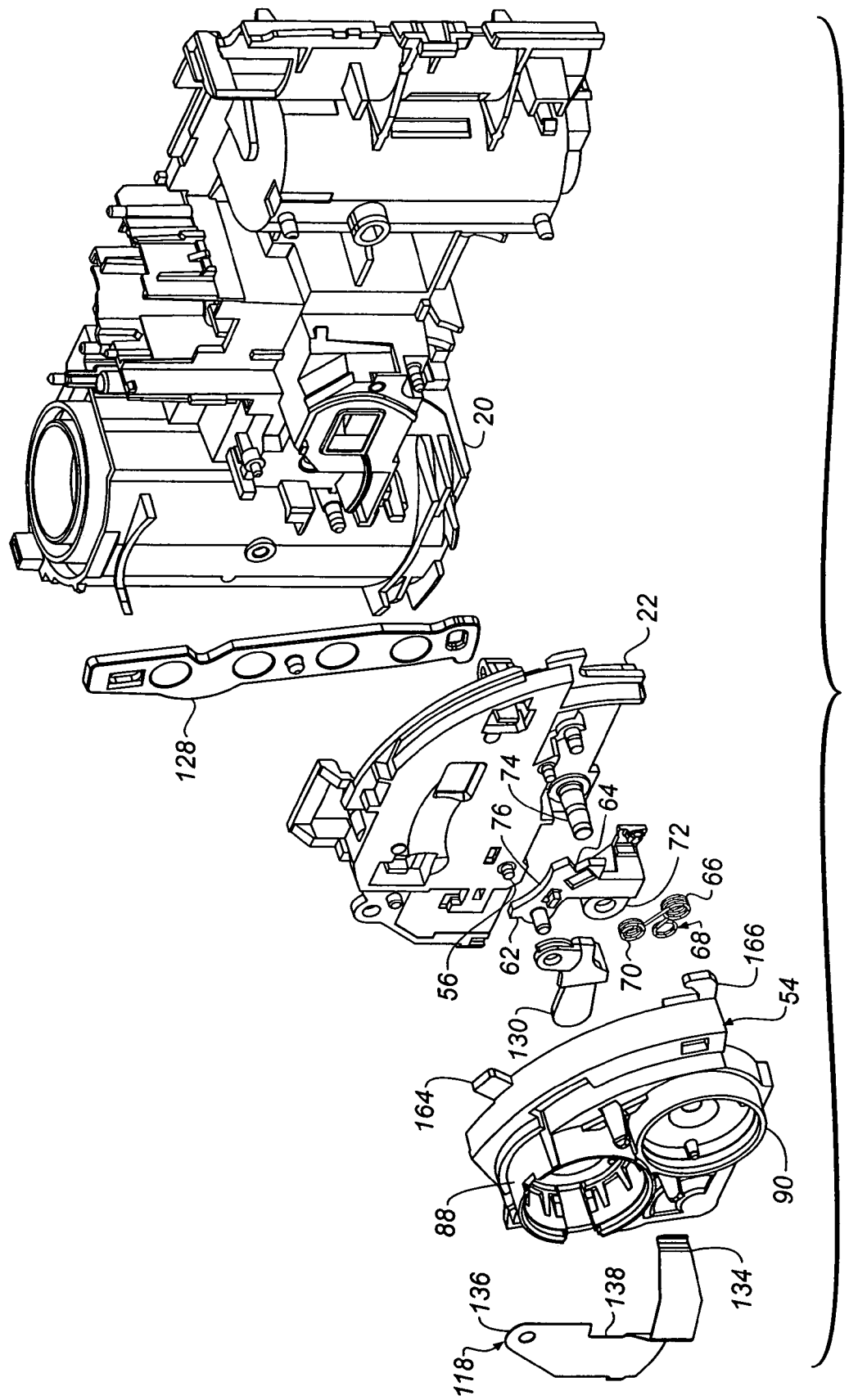
FIG. 3 is a partial enlargement of FIG. 2 showing the turret.
Figure 4:
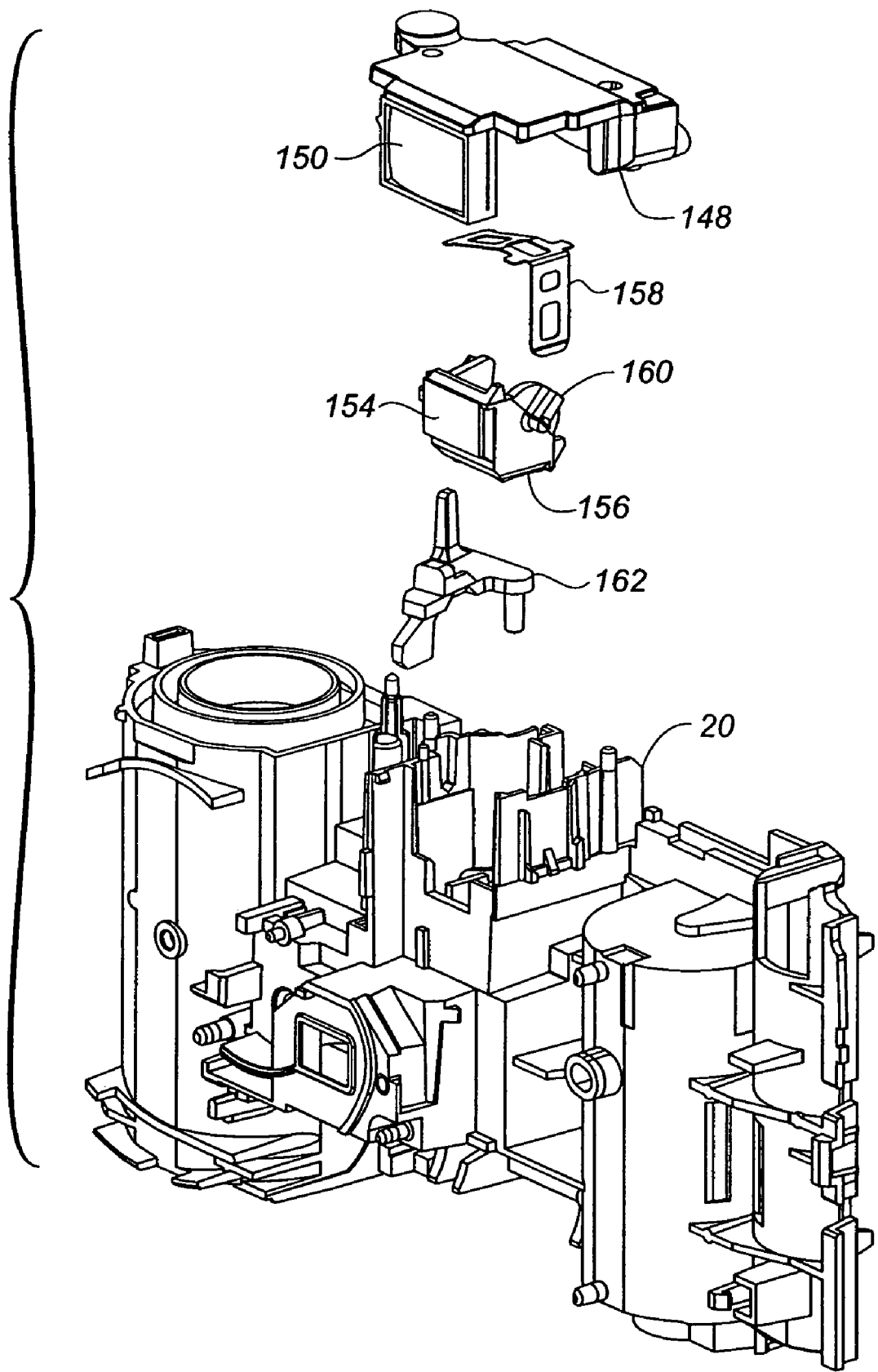
FIG. 4 is another partial enlargement of FIG. 2 showing the viewfinder.
Figure 5:
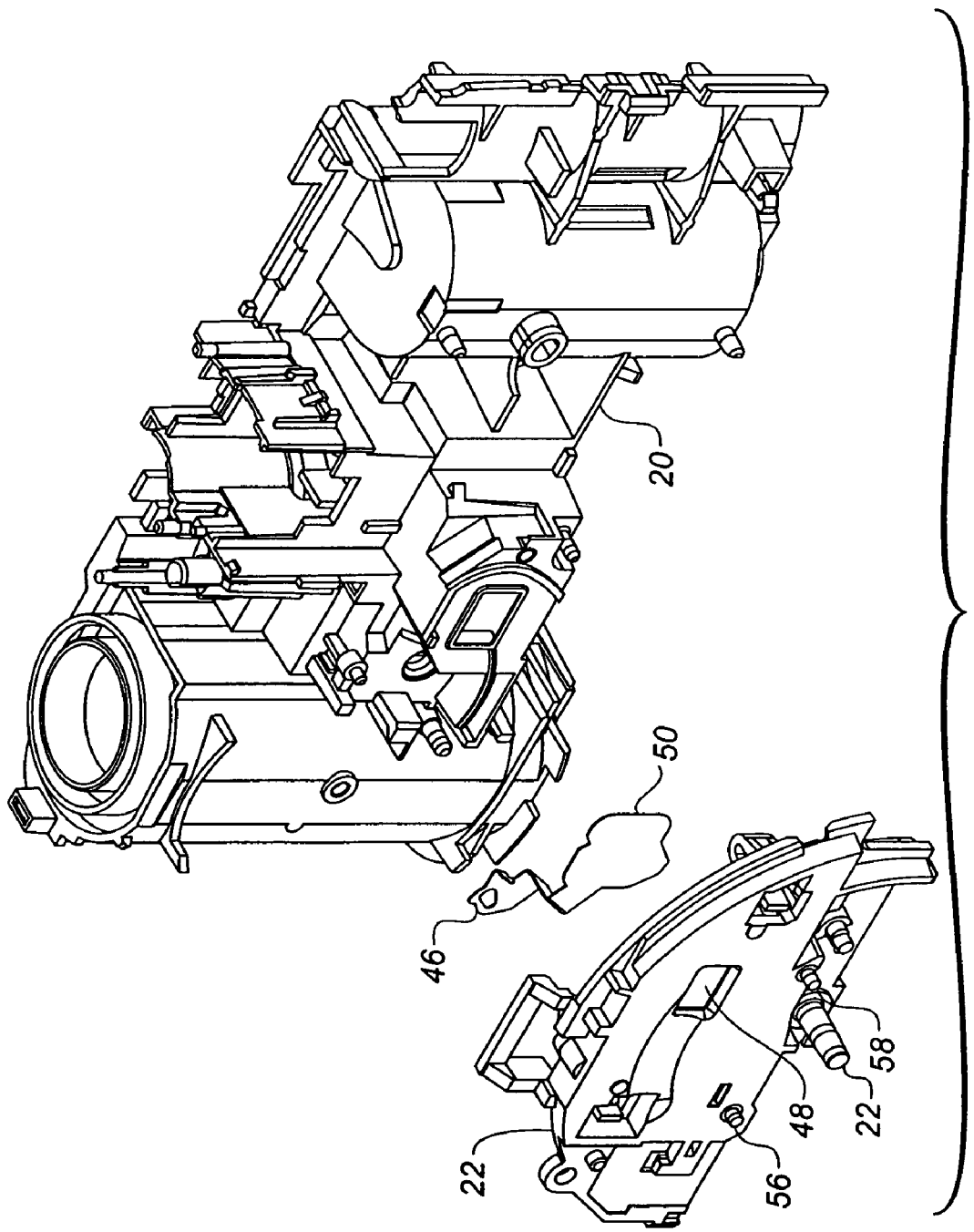
FIGS. 5–6 are front perspective views of the mount, frame, and shutter of the camera of FIG. 1, showing the relative location of the shutter.
Figure 6:
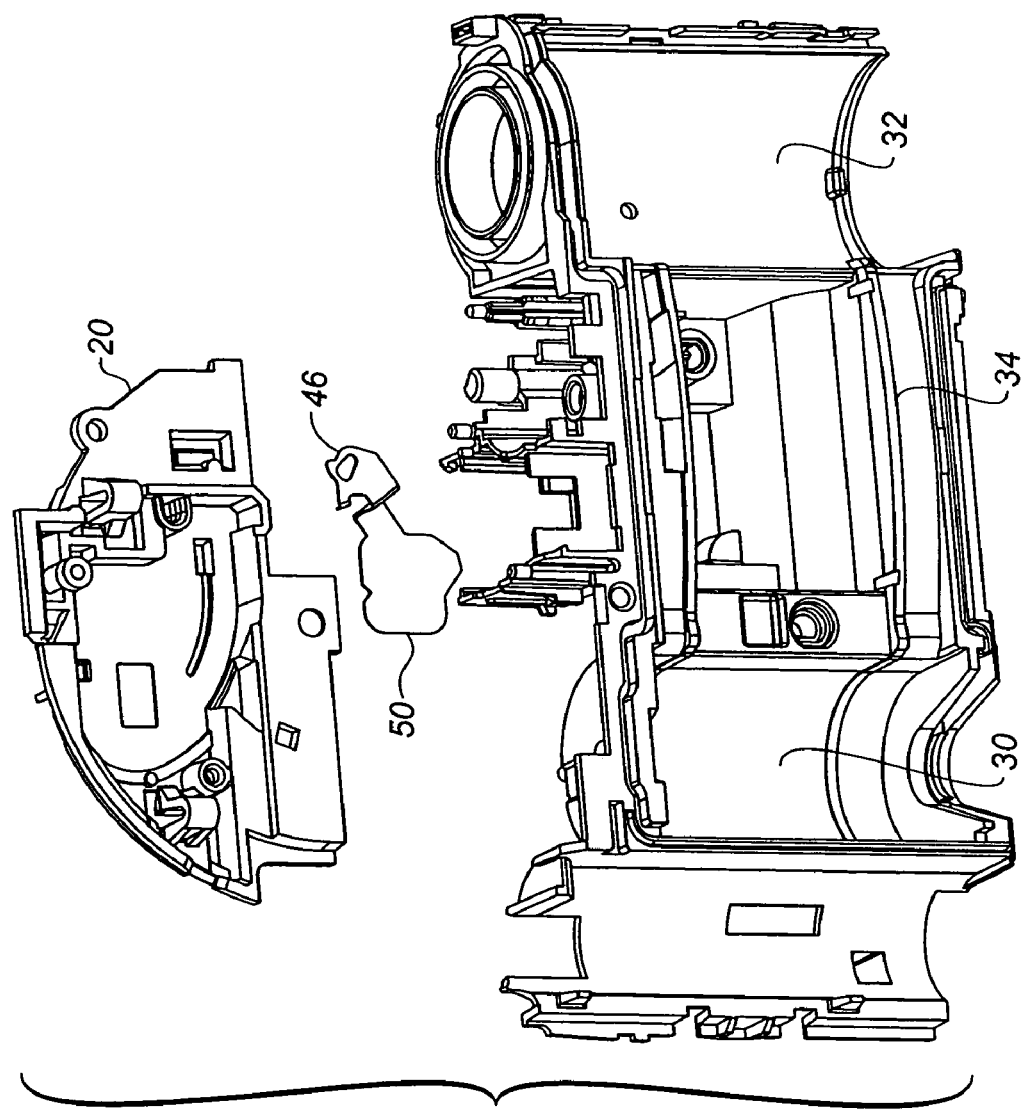
Figure 7:
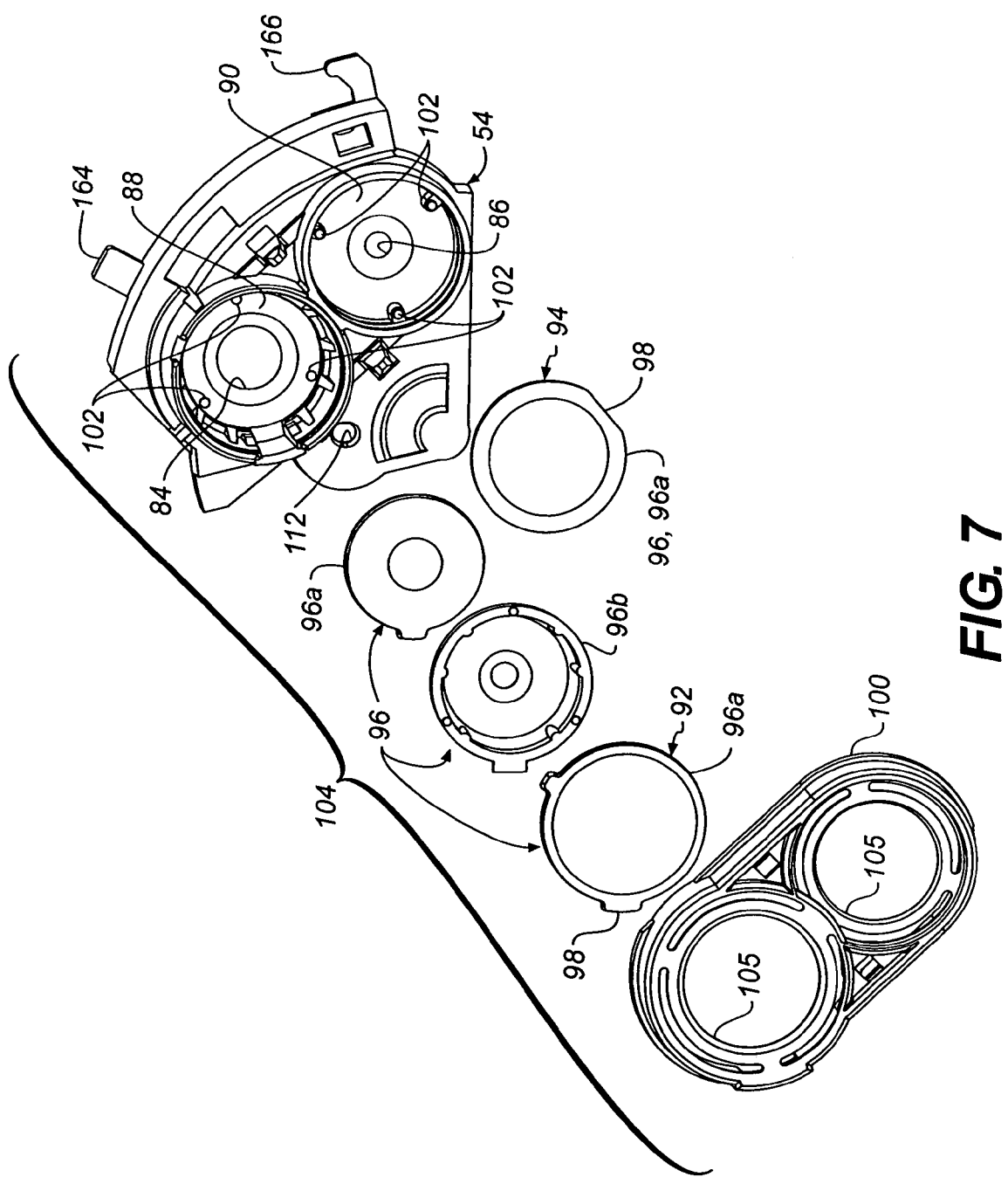
FIGS. 7–8 are front and rear views of the turret assembly of the camera of FIG. 1.
Figure 8:
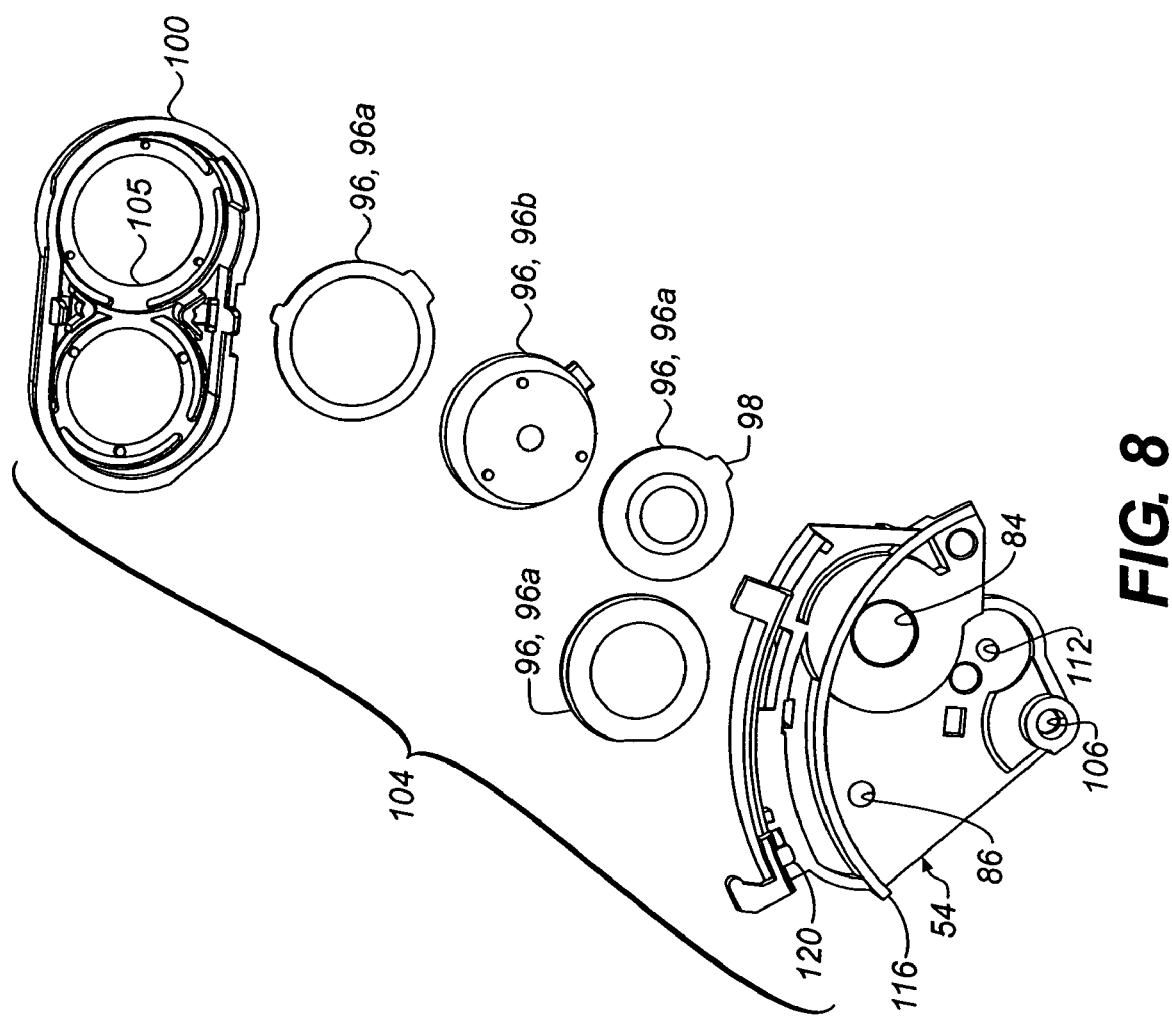
Figure 9:
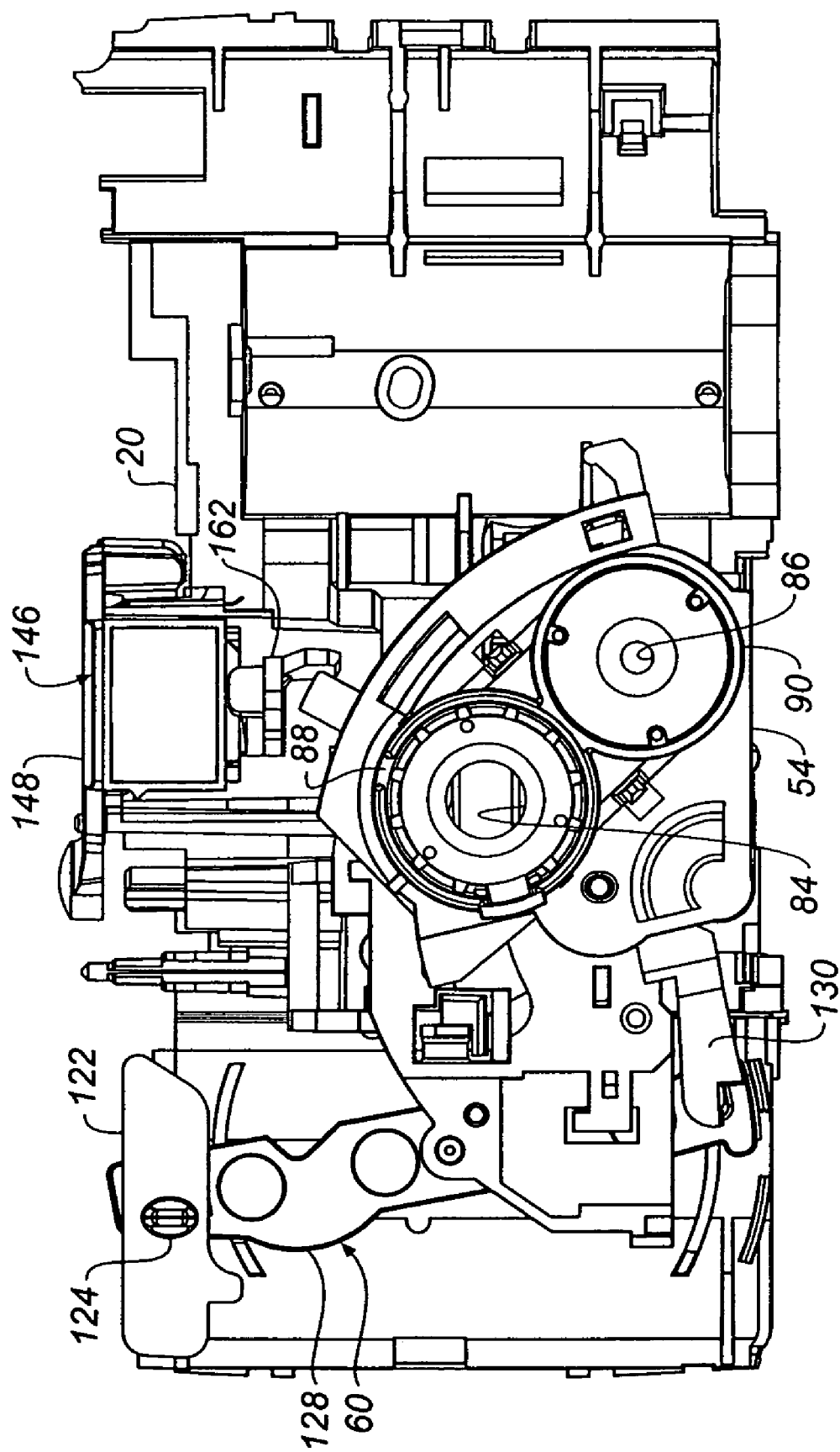
FIGS. 9–10 are front views of the turret-viewfinder-frame assembly of FIG. 1, showing the lens turret in the wide angle and telephoto configurations, respectively. The turret spring is not shown.
Figure 10:
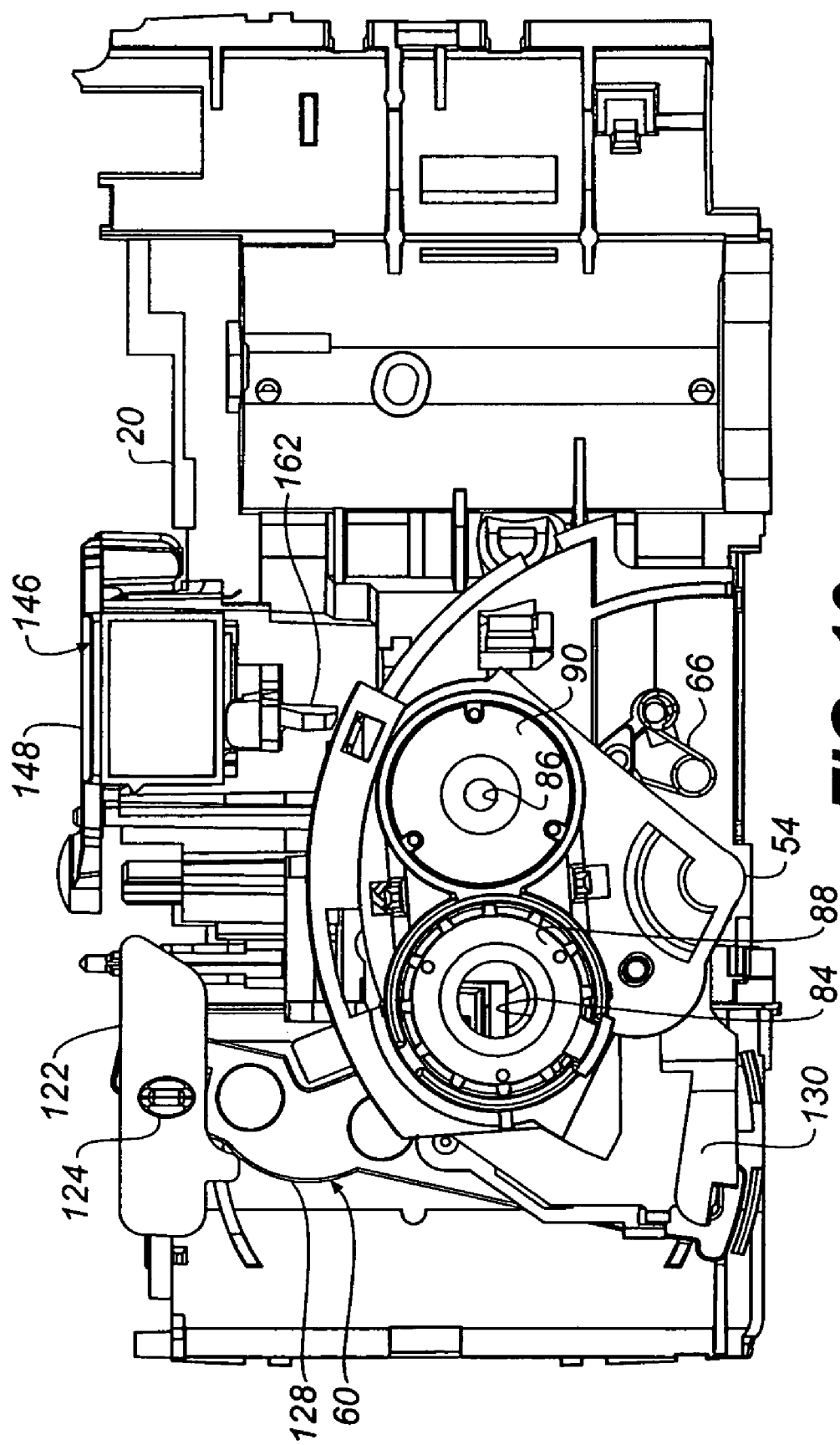
Figure 11:
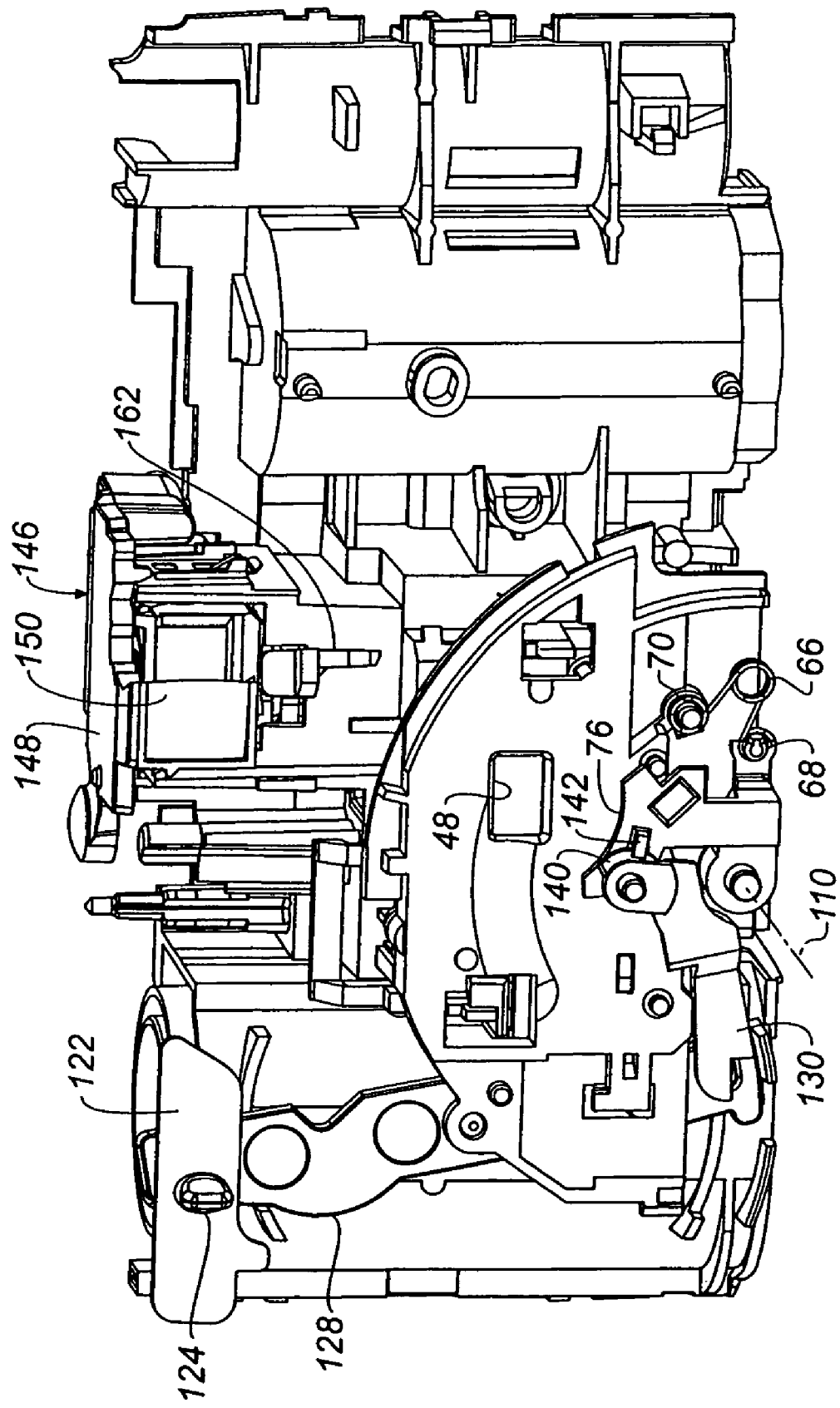
FIGS. 11–12 are front perspective views of the turret-viewfinder-frame assembly of FIGS. 9–10 with the turret removed, in the wide angle and telephoto configurations, respectively. The viewfinder is partially cut-away.
Figure 12:
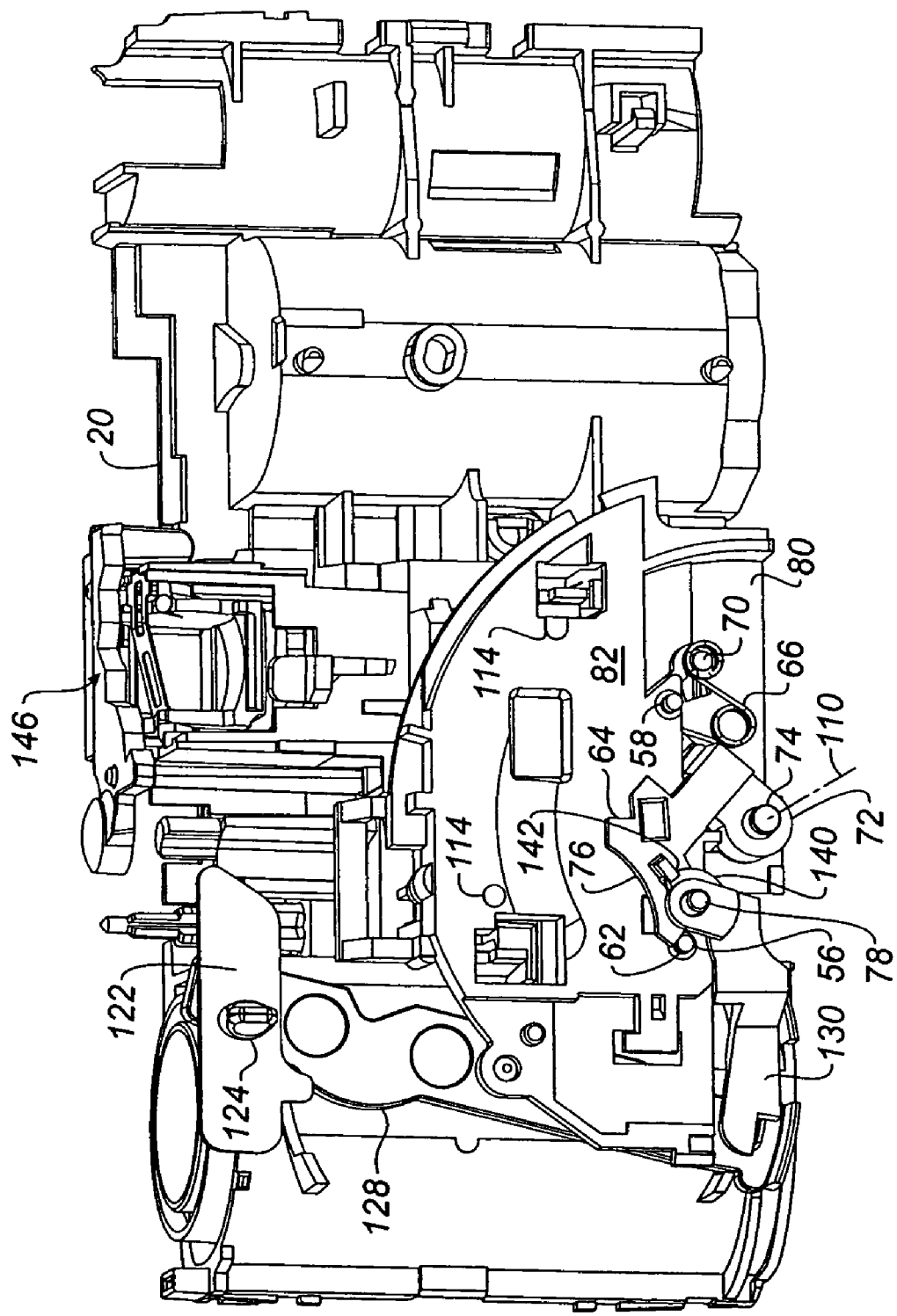

Turning now particularly to FIGS. 1–6, the camera 10 has a main member 12 held within a shell having a front cover assembly 14 and a rear cover 16. The front cover assembly includes a front cover 15. A label 18 is attached to the rear cover 16 and wraps around onto the front cover assembly 14. The main member 12 includes a frame 20 to which a number of other camera components are attached. In the embodiment disclosed herein, one of those components is a mount 22 that is joined to or formed as part of the frame 20. The main member 12 is illustrated in some figures as a turret 54-viewfinder-frame assembly 24, which is shown as including only components related to those features. It will be understood that other components can be provided in a manner well known to those of skill in the art.

The mount 22 has locating features, datums, and snaps that are used to join it to the frame 20 of the main member 12. The mount 22 can be permanently attached to the main member 12 or can be reversibly removable. The mount 22 can be assembled to the main member 12 by hooks and matching holdfasts (not shown). Other types of fasteners can also be used. The mount 22 can also be adhered to the frame 20, or held by friction fit, or by some other means. The mount 22 and frame 20 define an optical axis 26.

The camera 10 includes a capture unit 28 that captures and stores images. The type of capture unit used is not critical. For convenience, the camera 10 is generally described herein in relation to an embodiment that uses photographic film and is configured as a one-time-use camera 10. Features of other embodiments, such as reusable film cameras will be apparent to those of skill in the art.

Referring to FIGS. 1–6, the capture unit 28 captures images on photographic film (not shown). The frame 20 has a pair of opposed chambers 30,32. Film is wound from chamber 30 to chamber 32 across a capture plane 34. Film related features, such as a film transport-shutter charging mechanism 36, can be provided in a manner well known to those of skill in the art.

With an electronic capture unit, the photographic film is replaced by an electronic imager (not shown). The imager is controlled by a control system that includes electronic memory. Captured images are stored in memory and can be manipulated by the control system. Features of such electronic capture units are well known to those of skill in the art.

A flash unit 38 and other camera components, well known to those of skill in the art, can also be included in the camera 10. The flash unit 38 and other components are mounted to the frame 20 or held between the frame 20 and the covers 15,16. The flash unit 38 includes a lamp and reflector assembly 40 that is mounted to a circuit board 42 along with other components, such as a start switch 44. The start switch 44 is actuated to begin flash charging. A ready light (not shown) indicates when charging is complete.

A shutter 46 is disposed between the frame 20 and the mount 22. The shutter 46 is normally in a closed state in which the shutter 46 tightly covers a central shutter opening 48. The shutter 46 has a blade 50 that slides against the back of the mount 22. The shutter 46 is part of an operating mechanism that also includes a shutter release 51, and the film transport-shutter charging unit 36. A filmstrip (not shown) is advanced and the shutter 46 is charged by the film transport-shutter charging unit 36. The shutter release 51 is tripped by the user to release the shutter 46 for image exposure. A wide variety of shutter and film transport mechanisms are known to those of skill in the art. A typical simple mechanical mechanism (not shown), has an impact shutter operated by a high-energy lever that is charged as film is metered by a film metering feature during rotation of a thumbwheel to advance the filmstrip. The shutter mechanism that includes a shutter release 51 that is mounted to the frame 20. The shutter release 51 is releasable by the user to momentarily open the shutter 46. A single leaf impact shutter is shown that pivots, relative to the frame 20, between a closed position, in which a shutter opening 48 is blocked, and an open position, in which the shutter opening 48 is opened. A great variety of other suitable operating mechanisms are well-known to those of skill in the art and are commonly used in currently available cameras.

Opposite the shutter 46, a lens turret 54 rests on the mount 46. A rocker 52 rests on the mount 22 interior to the lens turret 54. The lens turret 54 and rocker are both pivotable or rotatable about the same pivot axis 110.

The mount 22 has opposed first and second stops 56,58. The camera 10 has a linkage 60 that is joined to the rocker 52. The linkage 60 is switchable between a first conformation and a second conformation to pivot the rocker 52 between first and second positions, respectively. The linkage 60 is illustrated as a train of links, but other parts can be used instead or in addition to supply like movement.

The rocker 52 pivots between the first and second positions relative to the optical axis 26 and the mount 22. This pivoting is in a plane perpendicular to the optical axis 26 about a pivot axis generally parallel to and spaced from the optical axis 26. The rocker 52 has a first stop feature 62 that abuts the first stop 56 in the first position and a second stop feature 64 that abuts the second stop 58 in the second position.

The rocker 52 is driven by a toggle 66; that is, an over-center mechanism 66 that urges the rocker 52 toward the nearer of the first and second positions. A convenient over-center mechanism 66 is a coil-type over-center spring having one end 68 attached to the rocker 52 and the other end 70 attached to the mount 22.

In the embodiment illustrated in the figures, the rocker 52 has a circular opening at one end 72 that closely engages a main post 74 that extends in an outward direction, parallel to the optical axis 26. The rocker 52 has a cross-piece 76 at the other end, which includes opposed stop features 62,64 and swings back and forth between the stops 56,58. The stop features 62,64 are in the form of opposed bits and the stops 56,58 are short posts that extend outward from the mount 22 and are engaged by the stop features 62,64. In the illustrated embodiment, a turret pin 78 extends outward from the cross-piece 76 near one of the stop features 64.

The main post 74 is located in a recessed lower portion 80 of the mount 22. The mount 22 has an upper portion 82 that includes the central opening 48 closed by the shutter 46. The rocker 52 is stepped and except at end 72 is spaced from adjoining portions 80,82 of the mount 22. One end 68 of the overcenter spring 66 is assembled to a post on the rocker 52 between the two ends 72,76 of the rocker 52. The other end 70 of the overcenter spring 66 is anchored to a post on the mount 22.

The lens turret 54 has primary and secondary openings 84,86, which are aligned alternately with the optical axis 26.

The lens turret 54 has primary and secondary nests 88,90, which surround respective openings 84,86. The nests 88,90 are on the opposite side of the lens turret 54 from the rocker 52. Located in respective nests 88,90 are first and second taking lenses 92,94. Each taking lens 92,94 has one or more lens components 96, including one or more lens elements 96a. An lens spacer 96b can also be included as one of the optical components 96, if desired.

In the embodiment shown in the figures, one of the two switchable taking lenses 92,94 is a wide angle doublet lens with an lens spacer located between the elements and the other taking lens is a telephoto singlet lens. The wide angle and telephoto lens elements have different optical powers, providing for different focusing distances or different focal lengths of the wide angle and telephoto lenses. Other optical elements can be provided in addition to or in place of one or both of the lens turret lens elements.

The lens components 96 move with the turret 54 and have features that block movement of the lens components 96 relative to the turret 54. The lens components closely fit in the respective nests 88,90 to block movement. Complementary alignment features 98 can be provided on components and respective nests 88,90 to block rotational of components 96 within the nests 88,90. The lens components 96 are held in place by a cap 100 that fits over both nests 88,90. In the illustrated embodiment, the cap 100 is snapped to the lens turret 54. The nests 88,90 include datums 102 that provide three point support for the lens components 96. The lens components 96 are held against the datums 102 by a constant inward bias provided by a pair of resilient flex rings 105 that are part of the cap 100. The lens turret 54, lens components 96, and cap 100 are also collectively referred to herein as the turret assembly 104.

The lens turret 54 rests on the main post 74 and on the upper portion 82 of the mount 22. The length of the main post 74 is such that the lens turret 54 is spaced from the end 72 of the rocker, at the main post 74. The lens turret 54 has a socket 106 that closely receives the outer end of the main post 74. The socket 106 blocks disassembly of the end 72 of the rocker 52 from the main post 74, trapping the rocker 52 between the turret 54 and the mount 22. The socket 106, main post 74, and end 72 are sized such that the end 72 of the rocker 52 is movable back and forth along the main post in a direction parallel to the optical axis, relative to and independent of the lens turret 54. The rocker 52 is also pivotable out of a plane perpendicular to the optical axis, within the limits provided by the fit of the rocker 52 on the main post 74. The rocker 52 is freely movable, except as constrained by the over-center mechanism 66.

When the rocker 52 pivots between first and second positions, the lens turret 54 is pushed by the rocker 52 over a relatively large angle, which moves the first and second taking lenses 92,94 between a first configuration, in which the optical axis 26 intersects the first opening 84 and first lens 92, and a second configuration, in which the optical axis 26 intersects the second opening 86 and second lens 94.

The lens turret 54 is loosely coupled to the rocker 52 by parts that together form a "loose coupling", that is, the lens turret 54 and rocker 52 have parts that form a connector joining the components in loosely coupled relation. The term "loosely coupled" and like terms, are used herein to refer to the relationship of parts having features that fit together tightly enough that large movements of one of the parts moves the other part, but smaller movements of one of the parts do not move the other part. In the illustrated embodiment, the lens turret 54 has a roughly oval pin slot 112 that loosely engages the turret pin 78 of the rocker 52. When the rocker 52 pivots, the turret pin 78 pushes the lens turret 54 causing the lens turret 54 to rotate about the pivot axis 110. The rocker 52 and lens turret 54 are independently movable over small distances.

The rotation of the turret 54 in the first and second configurations is in a plane perpendicular to the optical axis 26. The plane is defined by the mount 22 and the outer end of the main post 74. The pads 114 and outer end of the main post 74 provide three point contact with the turret 54. Three point contact reduces a risk of wobbling and, in addition, reduces the areas in contact to reduce friction. The upper portion 82 of the mount 22 has a pair of pads 114 and the turret 54 has a rail 116 that rides on the pads 114.

A turret spring 118 biases the turret 54 so as to seat the turret 54 against the mount 22, in three point contact. The turret 54 pivots under the biasing of the turret spring 118 until the pads 114 and main post 74 provide three point contact and the turret 54 is aligned with the optical axis 26. The lens turret 54 is not constrained by the rocker 52 or the over-center mechanism 66 from pivoting relative to a plane perpendicular to the turret pin 78 under the biasing of the turret spring 118.

The turret spring 118 is independent of the over-center mechanism 66 and the biasing provided by that mechanism. The turret spring 118 is weak relative to the over-center mechanism 66. The turret spring 118 has a spring modulus that is just sufficient to return the turret to the three point contact with mount 22 whenever the turret is switched.

The turret spring 118 also retains the turret 54 in place, that is, the turret 54 is freely removable from the mount 22, except as restrained by the turret spring 118 and, in the embodiment shown in the figures, by a tab 120 that protrudes from an edge of the turret 54 and extends behind the mount 22. The tab 120, which is particularly advantageous during camera 10 assembly, fits loosely, so as to not interfere with movement of the turret 54. In the illustrated embodiment, the turret spring 118 is a sheet metal spring having a free end 134 that acts on the turret 54 and a fixed end 136 that is trapped against the mount 22.

The over-center mechanism acts directly on the rocker 52. In the illustrated embodiment, the over-center spring 66 has one end 68 secured to the rocker 52. The rocker 52 contacts the stops 56,58 and moves between positions defined directly by the stops 56,58. In so moving, the rocker 52 may translate along the main post 74 parallel to the optical axis 26 and may tilt slightly relative to the mount 22 and the optical axis 26. This tilting out of a plane perpendicular to the optical axis is a function of the fit between the post 74 and the hole in the end 72 of two molded plastic castings: mount 22 and rocker 52. Very close tolerances are undesirable due to the resulting cost.

Since the turret pin 78 fits loosely and the rocker 52 is elsewhere spaced from the turret 78, this translating and tilting of the rocker 52 caused by the over-center spring 66 is not transmitted to the lens turret 54. This has important benefits for image quality. The rocker 52 does not interfere with the three point contact of the lens turret with the mount. Such interference would tend to seat the turret and taking lenses against the mount, not in three point contact, but rather tilted slightly out-of-plane, causing a large degradation of image quality. Stating this another way, due to the loose coupling of the rocker 52 and lens turret 54, the lens turret 54, during rotation to the first and second configurations, is independent of translational movement and out-of-plane pivoting of the rocker 52 induced by the over-center mechanism 66.

The rocker 52 is pivoted between first and second positions by a linkage 60 that extends from the rocker 52 to a user control. In the illustrated embodiment, the linkage 60 is operated by a slider 122, which has a button 124 that protrudes through a slotted opening 126 in the front cover 15 of the camera 10. The user pushes the button 124 from side to side within the slotted opening 126 to operate the rocker 52 and switch the taking lenses 92,94 of the camera 10.

In the illustrated embodiment, the slider 122 is disposed adjacent the shutter release 51 and, along with the shutter release 51 is spaced from the mount 22. The slider button 124 is disposed beyond the taking lenses 92,94, in a direction radial to the optical axis 26, at the same corner of the camera 10 as the shutter release 51. This is convenient, since the user can use the same finger to switch the lenses and depress the shutter release. All while keeping a subject in view through the viewfinder.

The slider 122 operates the rocker 52 through a linkage 60 having an outer link 128 engaging the slider 122 and an inner link 130 engaging the rocker 52. The slider 122 is positioned inward along the optical axis 26, relative the rocker 52 and the mount 22. The linkage 60 is stepped to bridge the distance. In the illustrated embodiment, the outer link 128 is disposed inward of the mount 22 in a direction parallel to the optical axis 26.

The slider 122 has free play relative to the rocker 52. This helps prevent the rocker 52 and turret 54 from moving slightly whenever the user rests a finger on the slider button 124 and also helps accommodate manufacturing tolerances. In the illustrated embodiment, the free play is provided by loosely coupling the outer link 128 to the slider 122 and the outer link 128 to the inner link 130 using a pin and slot arrangement. A mid-potion 138 of the turret spring 118 between the two ends 134,136, can retain the outer link 128 loosely coupled to the inner link 130, or the links can be held in place by other features, such as interlocks between parts.

The inner end 132 of the inner link 130 has a hole that closely engages the turret pin 78, between the cross-piece 76 of the rocker 52 and the turret 54. The inner link 130 acts on the rocker 52 and is spaced from the turret.

The linkage 60 is switchable between a first conformation and a second conformation to pivot the rocker 52 between the first and second positions, respectively. In a particular embodiment, the inner link 130 and rocker 52 have overlapping projections 140,142 that hold the rocker 52 and inner link 130 in alignment with each other and a plane perpendicular to the optical axis. The alignment due to projections 140,142 maintains the inner link 130 in spaced relation to the lens turret 54, thus, preventing the inner link 130 from contacting the turret 54 during switching and tilting the turret outward. This is simpler and cheaper than providing close fitting guide structures to hold the turret 54 in plane. As earlier discussed, out-of-plane pivoting of the lens turret, if allowed, would take the lens components out of parallel with the film plane, leading to dramatic loss of resolution.

Figure 13:
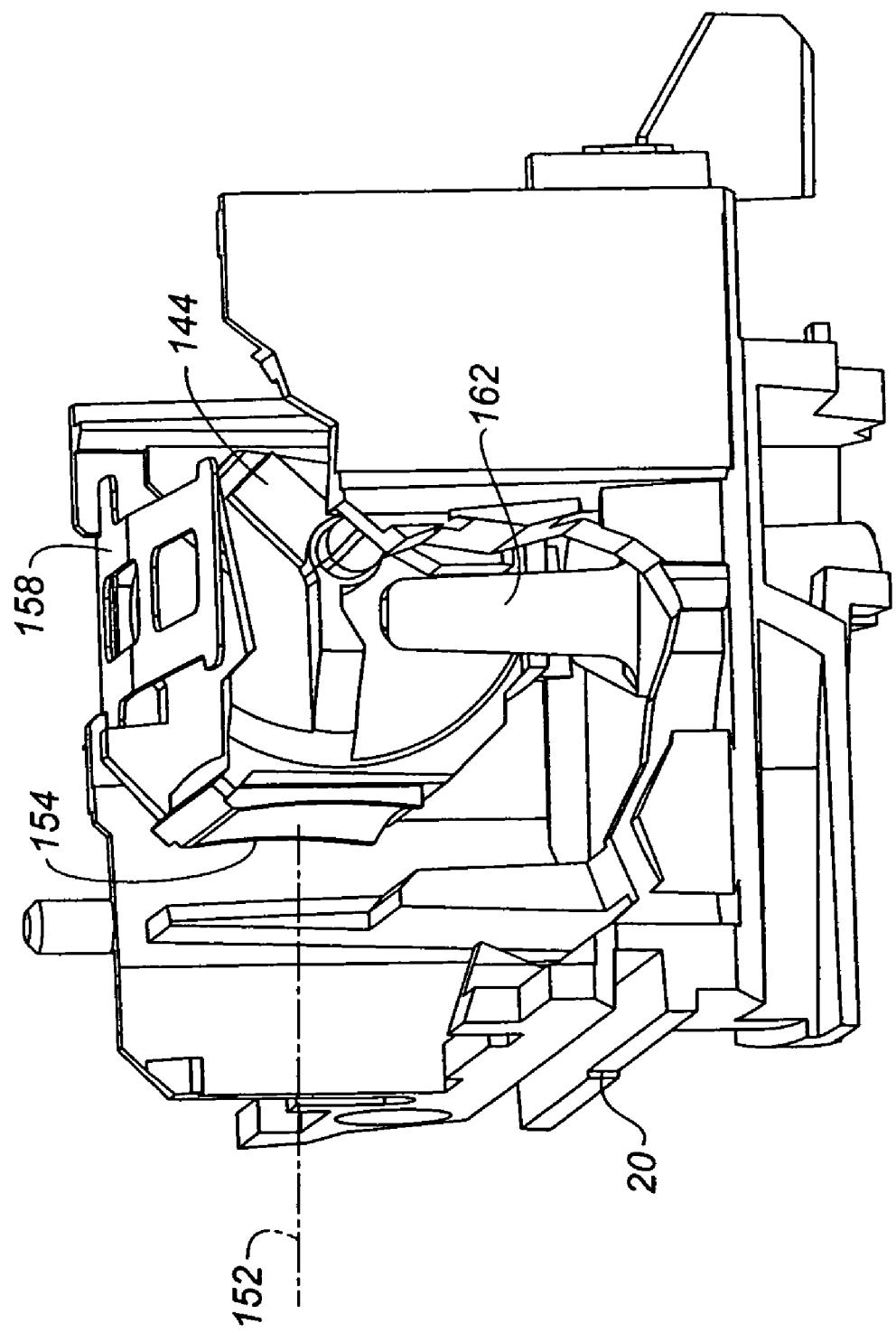
FIG. 13 is a partially cut-away view of the camera of FIG. 1, showing the viewfinder drum.
Figure 14:
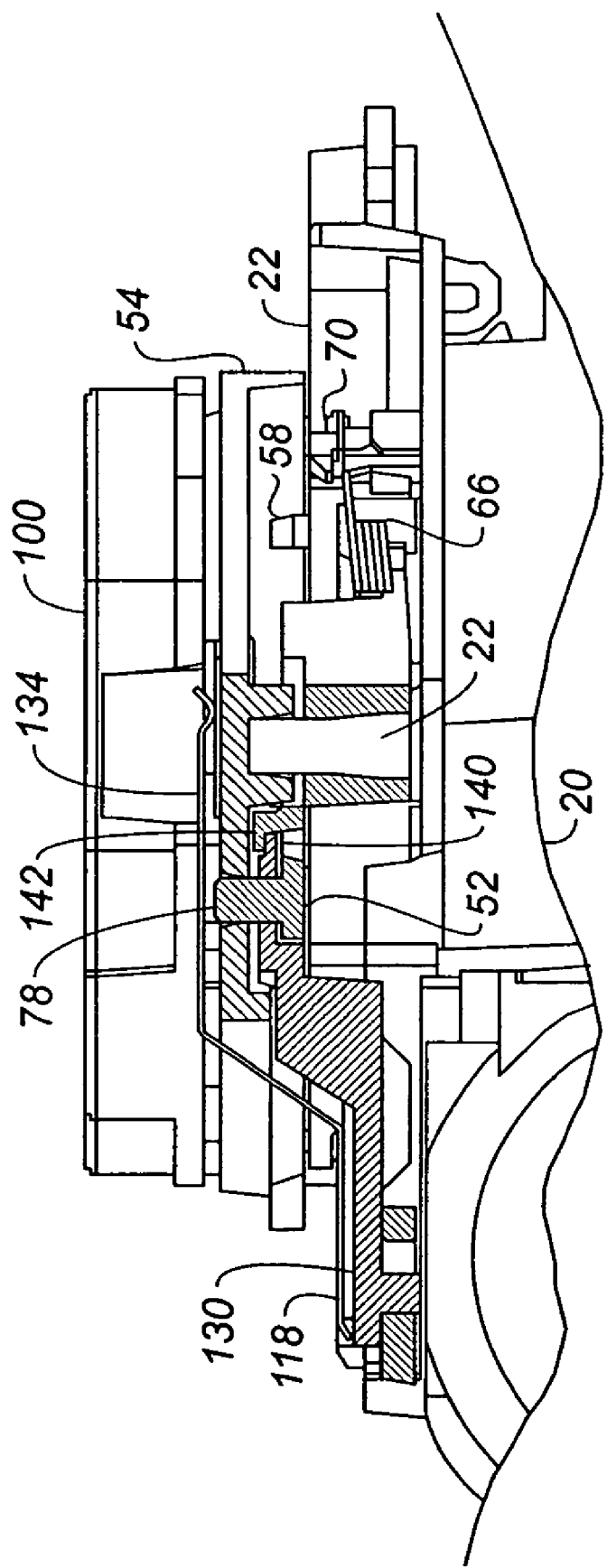
FIG. 14 is a cross-sectional view taken substantially along line A—A of FIG. 1, except that the lens turret is shown in a telephoto position.
Figure 15:
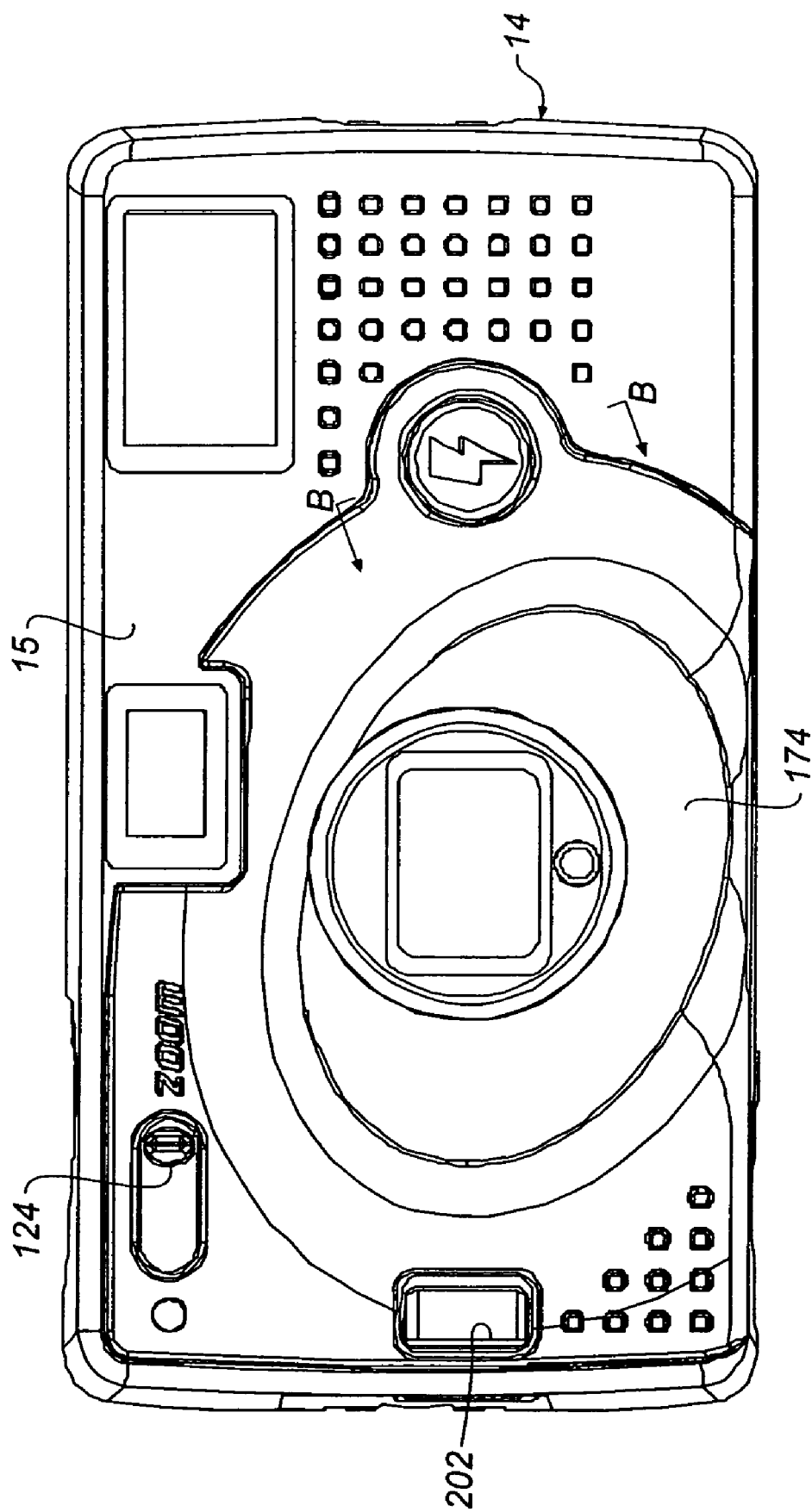
FIG. 15 is a front view of the front cover assembly of the camera of FIG. 1.
Figure 16:
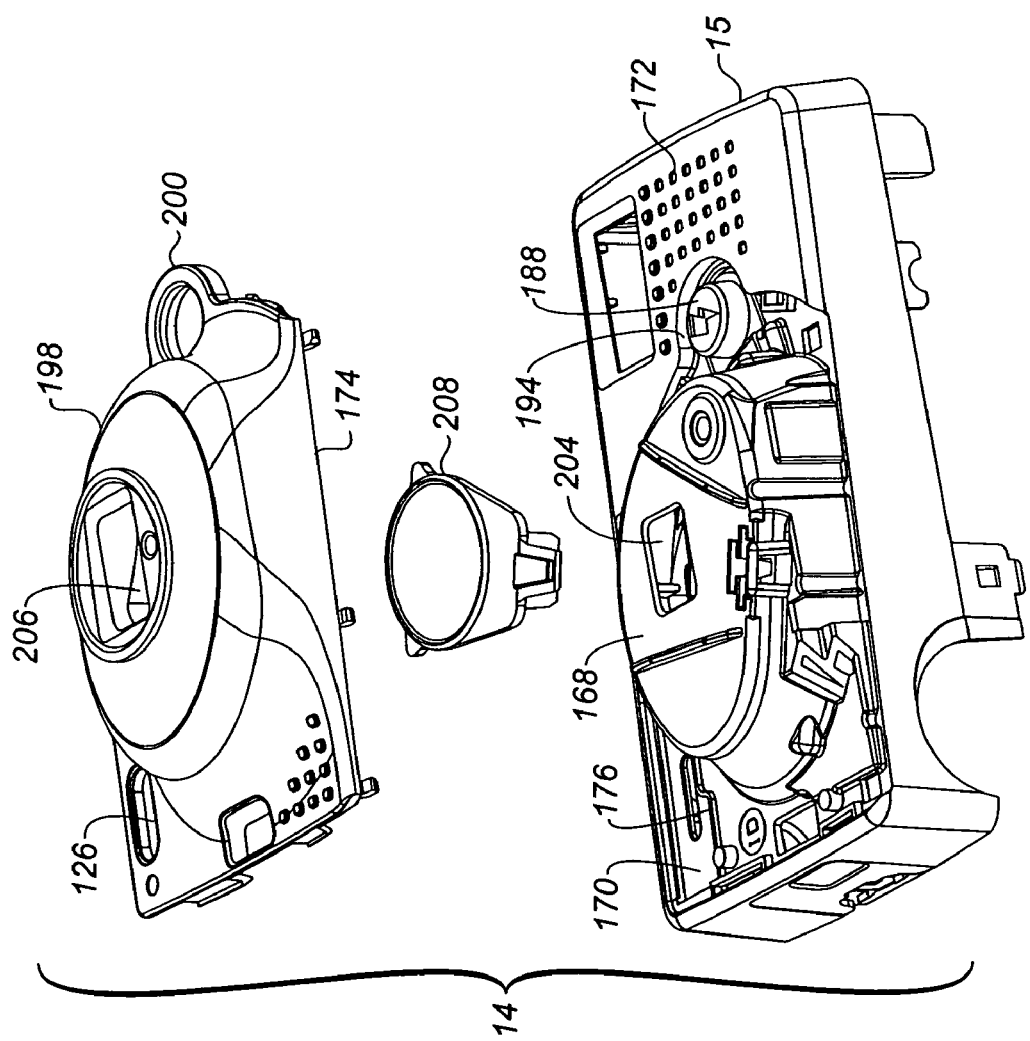
FIG. 16 is an exploded front, perspective view of the camera assembly of FIG. 15. The slider is not shown.
Figure 17:
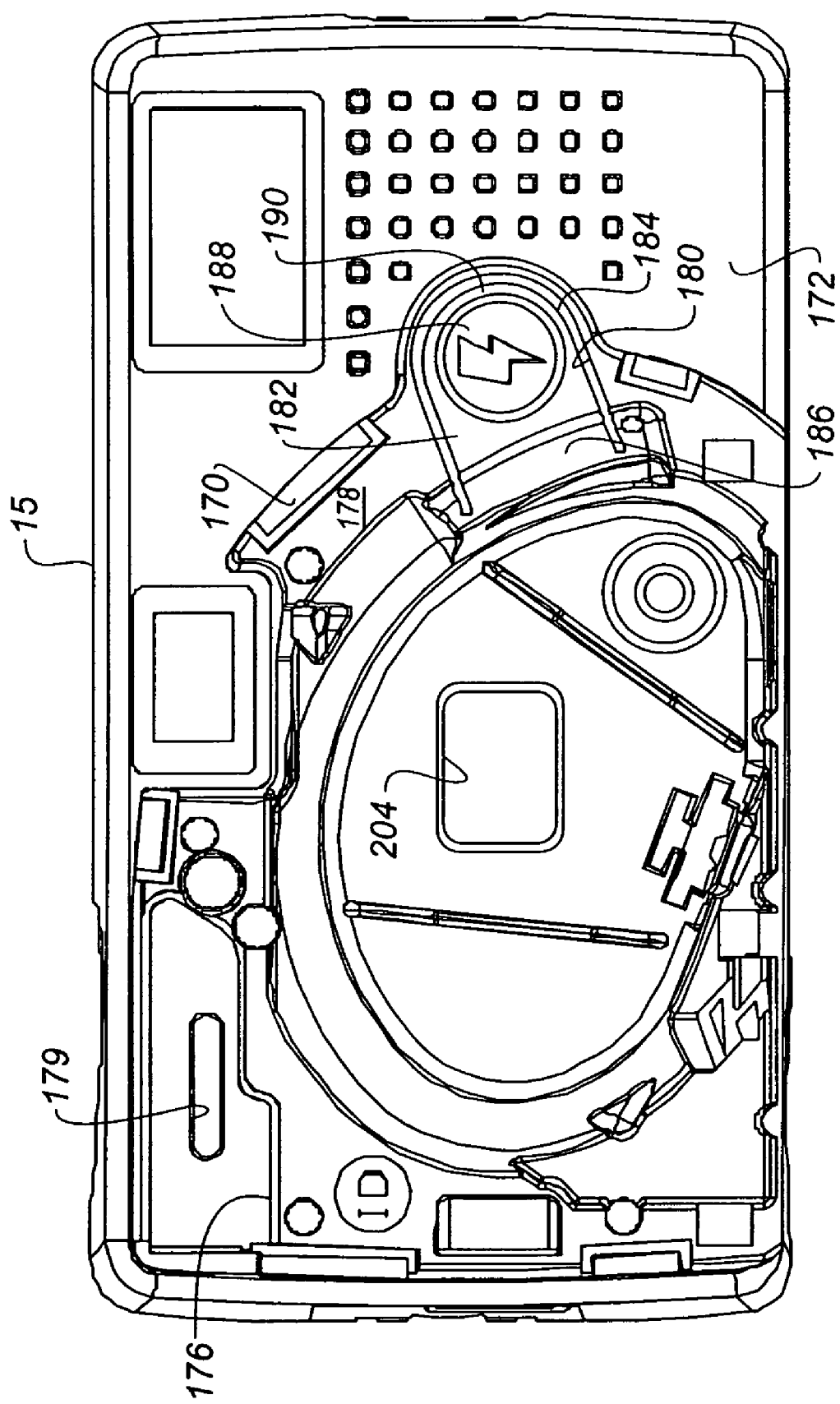
FIG. 17 is a front view of the front cover of the front cover assembly of FIG. 15.
Figure 18:
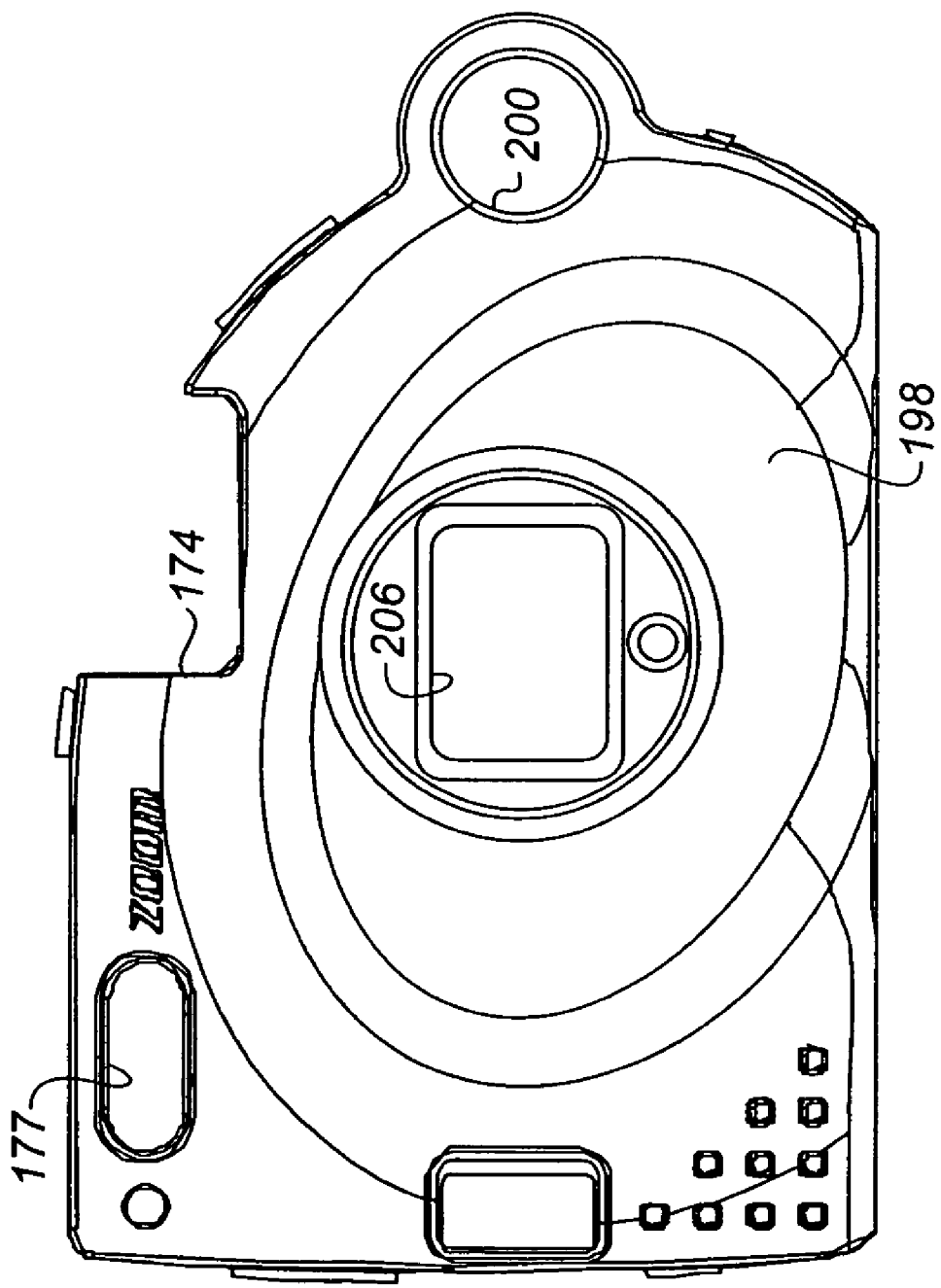
FIG. 18 is a front view of the guard of the front cover assembly of FIG. 15.
Figure 19:
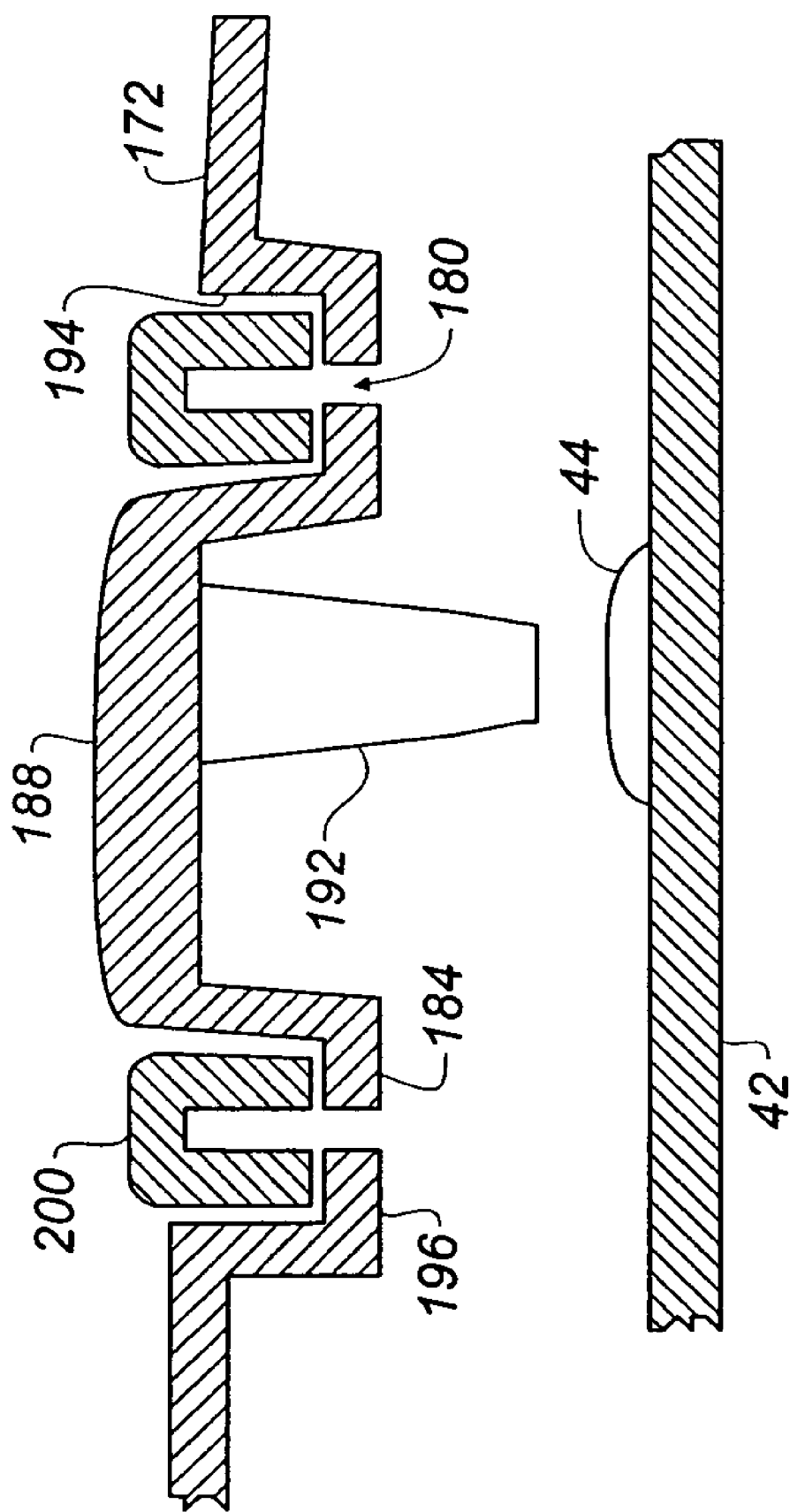
FIG. 19 is a partial cross-sectional view of the front cover assembly of FIG. 15 and flash unit of the camera of FIG. 1. The cross-section corresponds to line B—B of FIG. 15.

Referring particularly to FIGS. 2, 4, and 13–14, the camera can have a switchable viewfinder drum 144 that is pivotable between primary and secondary positions to change viewfinder magnification. The viewfinder drum 144 is driven by lens turret 54 motion. The viewfinder 146 has a main portion 148 that includes one or two fixed windows 150 that define a viewfinder axis 152 aligned with the optical axis 26. Each of the windows 150 may or may not have an optical power. In the illustrated embodiment, the main portion 148 includes an objective lens at the front, an eyepiece lens at the back, and the viewfinder drum 144 in the middle.

The viewfinder drum 144 has two different intermediate lenses 154,156 joined together on a turret 54 in orthogonal relation. In a particular embodiment, the drum 144, including the intermediate lenses, is a one-piece plastic casting. Each intermediate lens 154,156 is rotated alternately into the optical path in alignment with the viewfinder axis 152. The viewfinder drum 144 can be an assembly of loose lenses and a framework or can be a molded one-piece part. The viewfinder drum 144 rotates perpendicular to the viewfinder axis 152 to causing a magnification change in the viewfinder 146 that corresponds to the change provided by switching taking lenses 92,94.

The viewfinder drum 144 is biased to the nearer of its two positions by an over-center spring mechanism. In the illustrated embodiment, the mechanism is a sheet metal beam spring 158 that presses against a cam surface 160 on the drum 144 to push the drum 144 overcenter and hold the drum 144 against stop features (not separately shown). The rotating viewfinder drum 144 is driven by a lever 162 that rotates perpendicular to the pivoting of the viewfinder drum 144. The lever 162 is pushed back and forth by opposed tabs 164,166 provided on the turret 54. The main portion 148 of the viewfinder 146 holds drum 144 in place on the main member 12. Beam spring 158 is held by the main portion 148 or the frame 20. In a particular embodiment, the main portion 148 is a molded one-piece plastic casting that is snapped in place.

The drum rotation lever 162 is lightly biased relative to the over-center mechanism 66 attached to the rocker 52 and has free play relative to the drum 144, such that the drum 144 does not switch until turret 54 travel is nearly complete. This isolates the turret 54 from the over-center spring mechanism 158 of the drum 144. The rotation of drum 144 beyond positions for each of its lenses is blocked by viewfinder housing.

The camera 10 has a one-piece front cover 15 having a outwardly protruding lens hood 168, an inwardly recessed cup 170, and an outwardly facing grip portion or grip 172. The lens hood 168 defines a chamber that protects the lens turret 54. A one-piece guard 174 is mounted to the front cover 15 over the lens hood 168 and cup 170. The guard 174 is conveniently attached by hooks, but could be adhered in place or held by other means. The grip portion 172 is outside the guard 174 when the front cover 15 and guard 174 are assembled. In the illustrated embodiment, the slider 122 is trapped between the cup 170 and the guard 174 within a guide structure 176. The button extends out through an elongate opening 177 in the guard 174. A pin (not shown) extends inward through a portal 179 in the front cover 15.

The cup 170 extends inward to a floor 178. The floor 178 is flat in some places and is stepped outwards in others to avoid internal parts of the camera 10 and to form attachment structures receiving the guard 174.

The cup 170 is a through slot 180 that is shaped so as to define a tongue 182. The tongue 182 is resiliently flexible. (Suitable materials for the front cover 15 are well known to those of skill in the art, since commonly available one-time-use cameras have flash buttons in the form of a flexible tongue in the front cover of the camera.) The tongue 182 has a free margin 184 adjoining the slot and a fixed margin 186 contiguous with the remainder of the front cover 15. The tongue 182 has a cylindrical boss 188 that protrudes in an outward direction parallel to the optical axis 26. The boss 188 is at the free end 190 of the tongue 182, spaced in from the free margin 184. The tongue 182 has an inwardly extending actuating member 192 opposite the boss 188.

The through slot 180 is partially encircled by a sidewall 194 and is spaced inwardly from the sidewall 194. As a result, the floor 178 of the cup 170 includes an edge 196 located between the slot 180 and the adjoining sidewall 194. In the illustrated embodiment, the sidewall 194 is parallel to the optical axis 26 and adjoins the grip 172.

The guard 174 has a bezel 198 and a ring 200. The ring 200 is contiguous with the bezel 198. The bezel 198 enshrouds the lens hood 168 and, like the lens hood 168 protrudes outwardly. The guard 174 protects the enclosed parts of the camera 10 and can be made relatively rigid and tough. The ring 200 can be made less flexible than the tongue 182 to protect the tongue 182. The ring 200 is seated against the sidewall 194, encircles the boss 188, and covers the slot 180 and the free margin 184. This protects the slot 180 against intrusion, such as entry of foreign material.

Since the grip 172 and ring 200 are formed by separate parts, features can be provided to help distinguish the two during use. For example, a tactile difference can be provided. The front surface of one of the grip 172 and ring 200 can be recessed relative to the front surface of the other. Similarly, the front cover 15 and guard 174 are made of visually contrasting materials. A passage 202 for a carrying strap can be strengthened by providing the passage through both the front cover 15 and the guard 174.

The lens hood 168 and the guard 174 each have a window 204,206 centered on the optical axis 26. In a particular embodiment, the camera 10 includes a transparent coverglass 208 disposed between the lens hood 168 and the guard 174. The coverglass 208 can be detachably hooked to the lens hood 168 interior to the guard 174. This can facilitate reuse of parts during recycling. In combination, the guard 174 and coverglass can close most or all of the openings in the front cover 15 that extend into the camera 10. The coverglass 208 can be loosely hooked to the lens hood 168 and more firmly retained by the bezel 198. The sub-assembly comprised of the front cover 15, guard 174, coverglass 208, slider 122, and a front label 18 can all be made of materials that are compatible with each other to facilitate reuse as feedstock, since the parts can be ground up without disassembly.

The invention has been described in detail with particular reference to certain preferred embodiments thereof, but it will be understood that variations and modifications can be effected within the spirit and scope of the invention.

What is claimed is:

1. A camera assembly comprising:
    a mount defining an optical axis, said mount having opposed first and second stops;
    a rocker pivoting between a first position abutting said first stop and a second position abutting said second stop;
    an over-center mechanism biasing said rocker toward a nearer one of said first and second positions;
    a lens turret having a primary opening and a secondary opening, said lens turret rotating with said rocker between a first configuration and a second configuration upon said pivoting of said rocker between said first and second positions, respectively, said optical axis intersecting said first opening when said lens turret is in said first configuration, said optical axis intersecting said second opening when said lens turret is in said second configuration, said rocker being movable independent of said lens turret in both said configurations.

2. The camera assembly of claim 1 wherein said rocker is movable in a direction parallel to said optical axis independent of said lens turret in both said configurations.

3. The camera assembly of claim 1 wherein said rocker and said lens turret are connected by respective parts forming a loose coupling.

4. The camera assembly of claim 3 wherein said lens turret contacts said rocker only at said loose coupling.

5. The camera assembly of claim 1 further comprising a turret spring biasing said turret against said mount, wherein said rocker is trapped between said turret and said mount.

6. The camera assembly of claim 5 wherein said turret spring biasing is independent of said over-center mechanism biasing in both said configurations.

7. The camera assembly of claim 1 further comprising a turret spring biasing said turret against said mount, wherein said turret is movable by said turret spring relative to said rocker.

8. The camera assembly of claim 1 further comprising a turret spring biasing said turret into three-point contact with said mount.

9. The camera assembly of claim 8 wherein said lens turret is loosely coupled to said rocker.

10. The camera assembly of claim 1 wherein said lens turret is loosely coupled to said rocker.

11. The camera assembly of claim 10 further comprising a turret spring biasing said turret against said mount.

12. The camera assembly of claim 1 wherein said over-center mechanism is an over-center spring having one end joined to said mount and another end joined to said rocker.

13. The camera assembly of claim 1 further comprising a viewfinder having a viewfinder axis aligned with said optical axis, said viewfinder including a viewfinder drum having wide angle and telephoto viewfinder lenses disposed in orthogonal relation, said viewfinder drum being pivotable by said lens turret, relative to said viewfinder axis, between a wide angle position wherein said wide angle viewfinder lens is aligned with said viewfinder axis and a telephoto position wherein said telephoto viewfinder lens is aligned with said viewfinder axis.

14. The camera assembly of claim 13 wherein said viewfinder drum is a molded one-piece plastic casting.

15. The camera assembly of claim 14 wherein said viewfinder drum is pivotable about a drum axis perpendicular to said viewfinder axis.

16. A camera assembly comprising:
    a mount defining an optical axis, said mount having opposed first and second stops;
    a rocker moving between a first position abutting said first stop and a second position abutting said second stop;
    an over-center mechanism biasing said rocker toward a nearer one of said first and second positions;
    a lens turret having a primary opening and a secondary opening, said lens turret being switchable, by said moving of said rocker between said first and second positions, between a first configuration and a second configuration, respectively, said rocker being movable relative to said lens turret in both said configurations;
    a turret spring biasing said turret against said mount.

17. The camera assembly of claim 10 wherein said rocker pivots between said first and second positions relative to said mount and pushes said lens turret, which rotates between said first and second configurations and wherein said rocker is pivotable out of a plane perpendicular to said optical axis independent of said lens turret.

18. The camera assembly of claim 17 wherein said rocker is disposed between said lens turret and said mount and said rocker is translatable along said optical axis independent of said lens turret.

19. The camera assembly of claim 17 wherein said rocker and said lens turret are pivotable about a common pivot axis.

20. The camera assembly of claim 10 wherein said biasing of said turret is independent of said biasing of said rocker in both said first and second configurations.

21. The camera assembly of claim 10 wherein said lens turret is loosely coupled to said rocker.

22. The camera assembly of claim 21 wherein said turret spring biases said lens turret against said mount.

23. A method for switching lenses in a camera assembly comprising the steps of:

pivoting a rocker, in a plane perpendicular to an optical axis, between a first position abutting a first stop and a second position abutting a second stop;

during said pivoting, biasing said rocker toward a nearer one of said first and second positions;

switching a lens turret between a first configuration and a second configuration, with said rocker;

biasing said lens turret into alignment with a plane perpendicular to said optical axis, said biasing of said lens turret being independent of said biasing of said rocker.

24. The method of claim 23 further comprising maintaining said rocker and said lens turret in loosely coupled relation during said pivoting and switching.

25. The method of claim 24 further comprising allowing axial movement of said rocker relative to said lens turret during said pivoting and switching.

26. The method of claim 23 wherein said switching further comprises pushing said lens turret with said rocker and pushing a viewfinder drum between a wide angle position and a telephoto position with said lens turret.

27. An apparatus for switching lenses comprising:

means for pivoting a rocker, in a plane perpendicular to an optical axis, between a first position abutting a first stop and a second position abutting a second stop;

means for biasing said rocker, during said pivoting, toward a nearer one of said first and second positions;

means for switching a lens turret between a first configuration and a second configuration, with said rocker;

means for biasing said lens turret into alignment with a plane perpendicular to said optical axis, said means for biasing said turret being independent of said biasing of said rocker.

* * * * *